US008522131B1

(12) United States Patent
Geddes

(10) Patent No.: US 8,522,131 B1
(45) Date of Patent: Aug. 27, 2013

(54) INTERMEDIATION SYSTEM AND METHOD FOR ENHANCED RENDERING OF DATA PAGES

(75) Inventor: Martin Geddes, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1260 days.

(21) Appl. No.: 10/824,157

(22) Filed: Apr. 14, 2004

(51) Int. Cl.
*G06F 17/00* (2006.01)
(52) U.S. Cl.
USPC .......................................... 715/234; 715/273
(58) Field of Classification Search
USPC .......................... 715/513, 526, 730, 234, 273
See application file for complete search history.

(56) References Cited

U.S. PATENT DOCUMENTS

| | | | | |
|---|---|---|---|---|
| 6,121,970 | A * | 9/2000 | Guedalia ........................ | 715/760 |
| 6,643,641 | B1 * | 11/2003 | Snyder .............................. | 707/4 |
| 6,721,780 | B1 | 4/2004 | Kasriel et al. .................. | 709/203 |
| 6,925,485 | B1 * | 8/2005 | Wang et al. .................... | 709/202 |
| 2002/0007393 | A1 * | 1/2002 | Hamel ........................... | 709/203 |
| 2002/0165925 | A1 | 11/2002 | Hamilton, II et al. ........ | 709/213 |
| 2003/0058271 | A1 * | 3/2003 | Van Der Meulen ............ | 345/738 |
| 2003/0110296 | A1 | 6/2003 | Kirsch et al. .................. | 709/246 |
| 2004/0059783 | A1 * | 3/2004 | Kazui et al. ................... | 709/205 |

OTHER PUBLICATIONS

Thomason, Larisa, "Load Time Tip: Reuse, Optimize, and preload Images" vol. 3, No. 6, Jun. 2000. http://www.netmechanic.com/news/vol13/loadtime_no6.htm.

Wang, Zheng and Crowcroft, Jon., "Department of Computer Science, University College London, London WC1E 6BT, United Kingdom".
Tong, Sau Loon and Bharghavan, Vaduvur., Alleviating the Latency and Bandwidth Problems in WWW Browsing, Oct. 26, 1997. http://www.usenix.org/publications/library/proceedings/usits97/full_papers/tong/tong_html/tong.html.
Padmanabhan, Venkata N. and Mogul, Jeffrey C., "Using Predictive Prefetching to Improve World Wide Web Latency".
Jacobson, Quinn and Cao, Pei, Potential and Limits of Web Prefetching Between Low-Bandwidth Clients and Proxies.
Jiang, Zhimei and Kleinrock, Leonard, "Web Prefetching in a Mobile Environment" IEEE Personal Communications, Oct. 1998, pp. 25-34.
Davison, Brian D., "Predicting Web Actions from HTML Content" Jun. 15, 2002.
Duchamp, Dan, "Prefetching Hyperlinks" Usenix, Boulder, Colorado, Oct. 11-14, 1999.
Bestavros, Azer, "Speculative Data Dissemination and Service to Reduce Server Load, Network Traffic and Service Time in Distributed Information Systems" Mar. 1996.
http://shika.aist-nara.ac.jp/products/wcol/wcolE.html.

(Continued)

*Primary Examiner* — Adam M Queler

(57) ABSTRACT

An intermediary system is disposed along a communication path between a user device, such as a Web-enabled mobile phone, and a content server. The user device sends a request, such as an HTTP GET request, for a data page at the content server. The data page may be, for example, the hypertext markup language (HTML) code of a Web page. The intermediary receives the request and determines whether the requested data page includes a data reference, such as a uniform resource locator (URL) of an embedded image in the Web page. If the requested page includes a data reference, the intermediary creates a preload instruction and sends the preload instruction to the user device in a response to the request for the data page. The preload instruction instructs the user device to load the referenced data. The preload instruction may be a hidden frame.

1 Claim, 5 Drawing Sheets

(56) References Cited

OTHER PUBLICATIONS

Chinen, Ken-ichi and Yamaguchi, Suguru, "An Interactive Prefetching Proxy Server for Improvement of WWW Latency" Jul. 3, 2003 http://www.isoc.org/inet97/proceedings/A1/A1_3.HTM.

http://www.lists.evolt.org/archive/Week-of-mon-20020204/067827.html.

http://www.htmlgoodies.com/tutors/preload.html.

Lewis, Stephen, Newsgroup Message dated Jul. 24, 2000.

* cited by examiner

```
<BODY>
    <img src = "http://www.domain.com/image.jpg">       — 54
    <p>This image was loaded from the file image.jpg</p> — 52
</BODY>
```

Fig. 3a

```
<BODY>
    <img src = "http://www.domain.com/image.jpg" height="0" width="0">  — 56
        *    *    *  — 58
    <img src = "http://www.domain.com/image.jpg">       — 54
    <p>This image was loaded from the file image.jpg</p> — 52
</BODY>
```

Fig. 3b

```
<BODY>
<FRAMESET rows="0,*">
    <FRAME src="http://www.domain.com/image.jpg">       — 62
        *    *    *  — 58
    <FRAME src="http://www.intermediary.com/cached_webpage.html">  — 60
</FRAMESET>
<BODY>
```

Fig. 3c

```
     ⎧ <SCRIPT LANGUAGE = "JavaScript">
     ⎪     function preload() {
64 ──⎨         image_cache = new Image();
     ⎪         image_cache.src = "http://www.domain.com/image.jpg";
     ⎪     }
     ⎩ </SCRIPT>
</HEAD>                              66
<BODY OnLoad = "preload()"> —
        *    *    *  — 58
    <img src = "http://www.domain.com/image.jpg">       — 54
    <p>This image was loaded from the file image.jpg</p> — 52
</BODY>
```

Fig. 3d

```
<BODY>
<img src = "http://www.domain.com/image.jpg" height="0" width="0">  — 56
<META http-equiv="refresh" content="3;
     url=http://www.intermediary.com/cached_webpage.html">
<BODY>                                                              68
```

Fig. 3e

INTERMEDIATION SYSTEM AND METHOD FOR ENHANCED RENDERING OF DATA PAGES

BACKGROUND

This invention relates generally to a system and method for enhanced rendering of data pages. In a particular implementation, this invention relates to reducing the latency of rendering Web pages.

In a typical exchange over the World-Wide-Web, a user employs a Web browser to send over the Internet a request for a Web page to a content server. The content server processes the request and sends hypertext markup language (HTML) code over the Internet back to the browser. The HTML code often includes one or more image tags, which identify for the browser embedded images that appear in the Web page. If there are embedded images, the browser then sends a request for each of the images in the Web page, and the server responds by sending the images.

Because the browser cannot even request the embedded images until it has already received the HTML code, the individual attempting to view the Web page must wait first for the HTML code of the Web page to load, and then for the images to load. The time that elapses between when the browser requests the Web page and when the browser displays the complete Web page, together with its images, is known as latency.

Several techniques have been employed to reduce the latency of Web pages. In one widely used technique, the browser is provided with a "cache," a local memory in which resources loaded by the browser are stored, at least temporarily. The use of a cache obviates the need to reload resources that have been recently loaded by the browser when a user repeatedly visits the same Web page, or when the same resources (such as an image file displaying a company logo) are used in different pages of a Web site. When the browser is asked to display data, it looks first in the cache to determine whether that data has already been downloaded. Latency is thus reduced by avoiding duplicative requests to download data already stored by the browser.

In another technique for reducing latency, the browser accesses the Internet through a proxy server. When the browser requests data over the Internet, the proxy server determines whether it (the proxy server) has a copy of the requested data. If so, the proxy server itself sends the data to the browser, thereby avoiding the additional time it may have taken to retrieve the data from the content server.

The use of proxy servers and the local cache can reduce the amount of time between when a browser requests an imbedded image in a Web page and when the browser has finished loading the image. Nevertheless, a more rapid loading time does not eliminate the delay between when the browser requests a Web page and when it learns which embedded images to request in the first place. This delay can be especially significant to users who access the Web over high-latency systems such as wireless networks.

SUMMARY

An intermediary system is disposed along a communication path between a user device, such as a Web-enabled mobile phone, and a content server. The user device sends a request, such as a hypertext transfer protocol (HTTP) GET request, for a data page at the content server. The data page may be, for example, the hypertext markup language (HTML) code of a Web page. The intermediary receives the request and determines whether the requested data page includes a data reference, such as a uniform resource locator (URL) of an embedded image in the Web page. The intermediary may consult a data reference storage to determine whether the requested data page includes such data references.

If the requested page includes a data reference, the intermediary creates a preload page and sends the preload page to the user device in a response to the request for the data page. The preload page includes a preload instruction that instructs the user device to load the referenced data (such as an embedded image). The preload page further includes a display instruction that instructs the user device to load the requested data page. In an exemplary embodiment, the preload page includes a frame set in which the preload instruction is a hidden frame and the display instruction is a displayed frame.

BRIEF DESCRIPTION OF THE DRAWINGS

FIGS. 3a-3e illustrate exemplary instructions for use with the intermediary.

DETAILED DESCRIPTION

I. Overview of an Exemplary System

Figure 1:
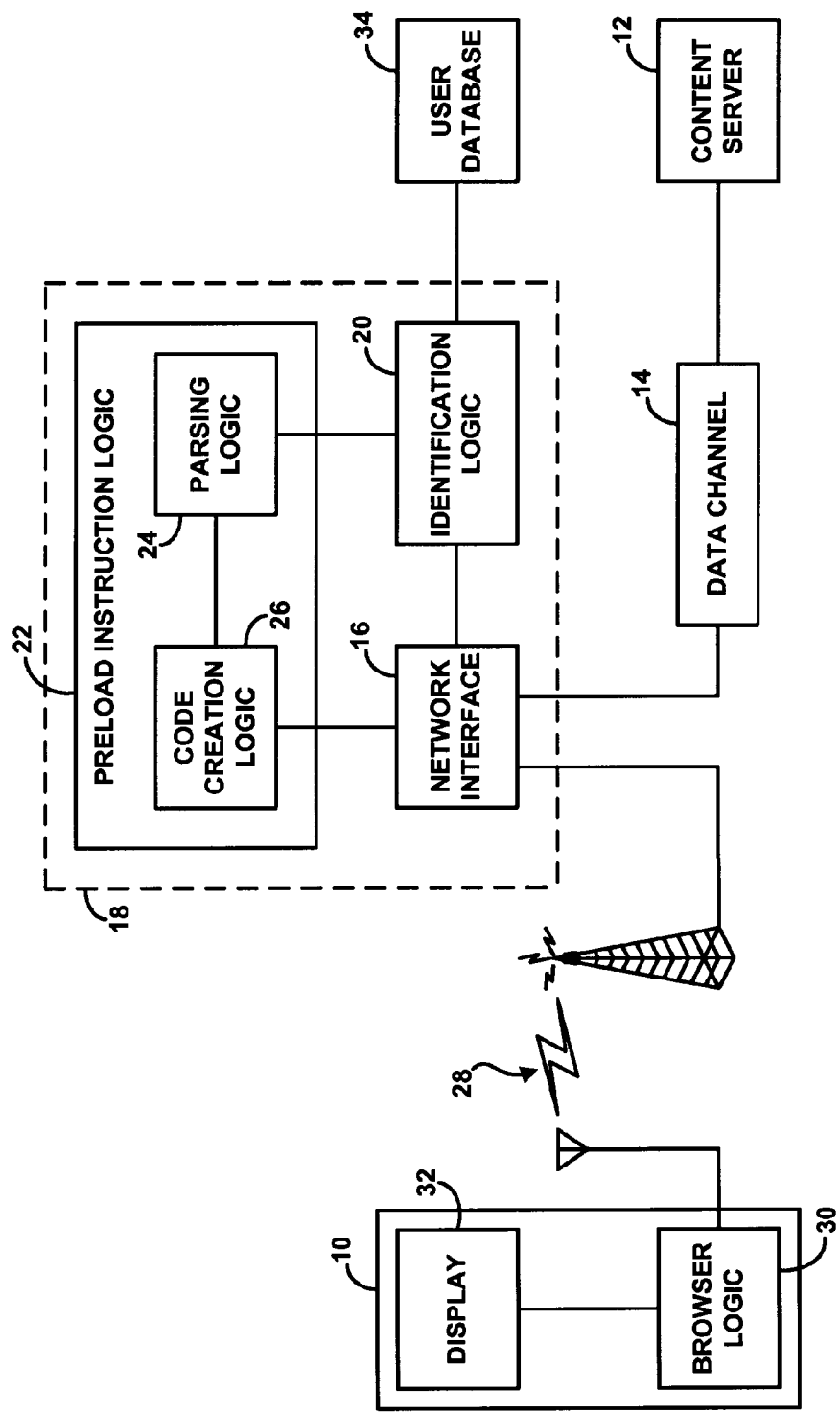
FIG. 1 is a schematic block diagram of the architecture of an intermediary.

In one embodiment of a system for enhancing the rendering of data pages, an intermediary is positioned along a data path between a user device, such as a mobile telephone operating a wireless Web browser, and one or more content servers, such as Web servers. The user device requests a data page, such as a Web page, from the content server. The intermediary intercepts the request and sends to the user device, as a response to the request, one or more preload instructions. The preload instructions instruct the user device to load data referenced in the requested data page. For example, the preload instructions instruct the user to load the embedded images in a data page.

The intermediary uses the data reference storage in determining what preload instructions, if any, will be sent to the user device. In this embodiment, the data reference storage associates requested Web pages with the uniform resource locators (URLs) of embedded images. Thus, when the intermediary intercepts a request for a Web page, it consults the data reference storage to identify the URLs of images embedded in the Web page. The intermediary then sends preload instructions that instruct the user device to load the embedded images. As a result, the user device may begin loading the embedded images even before it has received the HTML encoding the Web page. The intermediary also sends display instructions instructing the user device to display the requested Web page.

In one embodiment, the preload and display instructions are sent in the form of an HTML preload page that includes at least one hidden frame and a displayed frame. A preload instruction is a hidden frame tag that identifies an embedded image as the frame source. A display instruction is a displayed frame tag that identifies the Web page as its source. The preload page, then, is sent to the client device before the requested Web page is sent to the client device, allowing the client device to begin loading embedded images even if there is a delay in receiving the HTML of the requested Web page.

II. An Intermediary System

The system for enhancing the rendering of data pages may be implemented at an intermediary 18. The intermediary 18 is positioned along a data path between a user device 10 and one or more content servers 12. The intermediary 18 includes a network interface 16, which communicates with a user device 10 over a data channel 28. The network interface 16 further communicates with one or more content servers 12 over a data channel 14.

A. Generating Preload Pages

The intermediary intercepts page requests sent by a user device. For example, when the user device 10 requests a data page, such as a Web page at the content server 12, the user device sends a page request addressed to the content server 12 over the data channel 28. The request may be, for example, a hypertext transfer protocol GET request. The intermediary 18 intercepts the page request and sends its own page request to the content server 12, requesting the same data page that was requested by the user device 10.

After it intercepts a page request, the intermediary determines whether it should send preload instructions to the user device in a response to the page request. Identification logic 20 at the intermediary reads each page request that is received by the intermediary 18 and determines whether the page request will trigger the generation of preload instructions. In identifying which page requests trigger the creation of preload instructions, the identification logic 20 may rely on user attributes, such as user preferences or service levels. For example the identification logic may access a user database 34 to determine whether the user from whom the page request was sent has chosen to receive preload instructions. The user database 34 may include data identifying service levels for different users. The different service levels may be selected by users or by a service provider. The identification logic 20 may refer to a user's service level to determine whether or not preload instructions will be sent.

The identification logic 20 may also (or alternatively) refer to attributes of the page request in determining whether preload instructions will be generated. For example, if the page request is a request for an image file, the identification logic 20 may determine that preload instructions will not be generated, because image files do not themselves contain references to image files that could add to the latency experienced by the user. The identification logic 20 may identify requests for image files by determining whether a requested URL ends in ".jpg", ".jpeg", ".gif", or ".png". Similarly, the identification logic may determine that requests for other file types, such as ".txt," that cannot contain references will not lead to the creation of preload instructions. In one embodiment, only requests for HTML files trigger the creation of preload instructions.

If the identification logic 20 determines that preload instructions will not be sent in a response to the page request, then the intermediary sends the requested page to the user device in a response to the user device's page request. For example, if the page request was sent by the user device as an HTTP request over a TCP socket, the requested page may be sent to the user device in an HTTP response over the same TCP socket.

If, on the other hand, the identification logic 20 determines that preload instructions will be sent in response to the page request, then another component of the intermediary—code creation logic 26—creates the preload instructions, which are then sent to the user device 10 in a response to the page request. If the page request was sent by the user device as an HTTP request over a TCP socket, the preload instructions may be sent to the user device in an HTTP response over the same TCP socket.

The code creation logic 26 may also create display instructions that instruct the user device 10 to display the Web page requested by the user device. The preload instructions and display instructions may be sent to the user device as a preload page, which may be a page of HTML data. The preload page may be sent to the user device 10 in response to the user device's page request, before the requested data page is sent to the user device. In that way, even if there is a delay in receiving the data page itself, the user device may begin preloading referenced data, such as embedded images, even before the data page is sent to the user device.

The format of preload instructions and display instructions are discussed in further detail in sections II.A.1 and II.A.2, respectively. Examples of preload pages are provided in section II.C, below.

1. Preload Instructions

Preload instructions are code, such as HTML code, that, when sent to the user device, causes the user device to load a resource. Preload instructions themselves do not cause the user device to display the resource. Where the user device 10 runs browser logic 30, for example, a preload instruction causes the browser logic 30 to load a resource into a cache without displaying it on a display 32 (such as an LCD).

In creating the preload instructions, the code creation logic 26 determines what data the user device 10 should preload for the data page requested by the user device. To do so, the code creation logic 26 consults data reference storage 25. The data reference storage 25 associates data pages with data references in those data pages. For example, where the data page has embedded images, the data reference storage 25 may store a list of URLs of those embedded images. The list may be indexed by a URL of the data page. In this case, when a user device requests a data page at a selected URL, the code creation logic 26 determines whether a list corresponding to the selected URL is stored in the data reference storage 25. If such a corresponding list is stored in the data reference storage 25, then preload instructions are created to instruct the user device to load the embedded images at the listed URLs.

In one embodiment, a preload instruction is an HTML hidden frame. The code creation logic 26 creates a hidden frame whose source is the data reference. For example, the code creation logic 26 may create code including the following lines:

<FRAMESET rows="0,*">
<FRAME src="http://www.domain.com/image.jpg"

EXAMPLE 1

In Example 1, the first line defines a frame set in which the first frame takes up zero rows and thus is not displayed by a browser (i.e., it is a hidden frame). The second line creates the hidden frame and identifies the source of the hidden frame as the data reference "http://www.domain.com/image.jpg". Additional forms for preload instructions are discussed below with respect to FIG. 3.

In one embodiment, the preload instruction instructs the user device to load a copy of the referenced data that has been cached by the intermediary. In this embodiment, the preload instruction may include the address of the cached version of the referenced data. For example, in place of listing the frame source as "http://www.domain.com/image.jpg", the preload instruction may list the frame source as "http://www.intermediary.com?file=www.domain.com/image.jpg".

2. Display Instructions

A display instruction is code that instructs a device to display material to a user. The display instructions may be interpreted by a browser running on the user device. Display instructions in an HTML page may be, for example, text and text formatting instructions, tags, tables, and scripting language instructions. Some display instructions do not include any data references. For example, the following display instruction in HTML instructs a browser to display a paragraph of plain text:

<p>The Willow-Wren was twittering his thin little song, hidden himself in the dark selvedge of the river bank.</p>

EXAMPLE 2

There are no data references in the instruction of Example 2. Rather, the material to be displayed (the text between <p> and </p>) is included in the instruction itself.

Other display instructions do include a data reference. A data reference identifies referenced data that is not provided in the data page, but which a browser is instructed to display together with the data page. One such display instruction is an HTML image tag. An exemplary HTML image tag takes the following form:

<img src="[URL]" width="[width in pixels]" height="[height in pixels]">

EXAMPLE 2

The text "img" identifies the tag as an image tag. The parameter "src" is the source of the image, and it specifies the address of the data referenced by the image tag. The address can be, for example, a URL, either absolute or relative, of the referenced data. That referenced data may be, for example, a JPEG or GIF image file. The "width" and "height" parameters optionally specify the size of the image as it is intended to be displayed on a display 32 of the user device 10.

B. Identifying Data for Preloading

The intermediary 18 monitors data pages sent by content servers to determine what preload instructions, if any, will be sent to a user device that has requested a data page. To perform this task, the intermediary 18 is provided with page parsing logic 21. In one embodiment, when a data page is sent by a content server to a user device, the page parsing logic 21 identifies in the data page any display instructions that include a data reference (such as imbedded image tags that include the URL of an image file).

Where the original data page is an HTML page, the page parsing logic 21 may identify pages that include display instructions with data references by, for example, searching for image tags in the HTML page, such as the following:

<img src="http://www.domain.com/image.jpg">

EXAMPLE 4

After identifying display instructions with page references, the page parsing logic 21 stores the data references (e.g., the URL of the image files) in the data reference storage 25. In example 4, the page parsing logic 21 locates the URL "http://www.domain.com/image.jpg" in the display instruction and stores the URL in the data reference storage 25. Where the context allows (for example, where the data page being parsed is located at "http://www.domain.com/index.html") the complete URL may be shortened to a relative URL, such as "image.jpg".

The parsing logic 21 may store additional profile information in the data reference storage 25 to enable more efficient preloading of referenced data. In one embodiment, the page parsing logic 21 supplies a ranking of data references. For example, it can be particularly frustrating for a user attempting to visit a Web site when images necessary for navigating through the site—such as images that display hyperlinked buttons labeled "Next," "Previous," and "Home"—are delayed in loading. The parsing logic 21 may identify such images (by image size, for example, or by identifying file names such as "next.gif") and provide them with a high ranking in the data reference storage 25. As an alternative or in addition to ranking data references, the page parsing logic may identify the size of the referenced data and store size information in the data reference storage 25.

Various techniques for identifying data references for preloading have been described in the literature and may be employed by the intermediary. See, for example, K. Chinen & S. Yamaguchi, "An Interactive Prefetching Proxy Server for Improvement of WWW Latency," in Proceedings of INET 1997; A. Bestavros "Speculative Data Dissemination and Service," in Proceedings of ICDE 1996; V. N. Padmanabhan & J. C. Mogul, "Using Predictive Prefetching to Improve World Wide Web Latency," in Proceedings of the ACM SIGCOMM 1996 Conference.

C. Exemplary Preload Pages

Examples of preload pages that include different forms of preload instructions and display instructions are illustrated in FIGS. 3a-3e. FIG. 3a illustrates a data page 50 including one display instruction 52 for displaying text and another display instruction 54 for displaying an image. The display instruction 54 for displaying an image includes a data reference to image data located at the URL "http://www.domain.com/image.jpg". The data page 50 encodes a simple Web page that displays an image with a caption reading "This image was loaded from the file image.jpg". If no preload instructions were sent to the browser, the browser would display the caption of the image while waiting for the image to load. FIG. 3b then illustrates a preload page, additionally including a hidden image tag 56.

FIGS. 3c-3e illustrate different formats in which preload instructions can be created by the intermediary 18, and different means by which the preload instructions may be sent by the intermediary to the user device 10. Different embodiments of the intermediary may employ one or more of these formats in creating and sending preload instructions.

In the example of FIG. 3c, the intermediary sends to the user device a preload page 51. The preload page 51 includes a preload instruction 62, which instructs the user device to load the image, and a display instruction 60, which instructs the user device to display the data page. In this example, the preload instruction 62 and the display instruction 60 are both frame tags. The preload instruction is a zero-sized frame tag that identifies the image reference as its source and thus corresponds to the image reference in the display instruction 54 of FIG. 3a.

The display instruction 60 defines a displayed frame and identifies a cached version of the data page as its source. In the example of FIG. 3c, the data page is stored in a page cache 27 at the intermediary 18, having been copied from the content server 12. When the browser interprets the display instruction 60, it requests the original data page from the system 18 and displays the original data page in the displayed frame. In an alternative embodiment, the instruction 60 identifies the location of the data page at the content server 12.

The example of FIG. 3d next illustrates how a preload page can be provided using JavaScript that defines a preload script.

Further, in the example of FIG. 3e, the preload instruction, sent as a hidden image tag 56, is sent together with an HTML refresh instruction 68. The browser interprets the refresh instruction by waiting three seconds before requesting the original data page. In the example of FIG. 3e, the browser is instructed to request the original data page from the page cache 27 of the intermediary, but in an alternative embodiment, the browser may be instructed to request the original data page from the content server.

Although the preload and display instructions are illustrated in FIGS. 3a-3e with instructions in HTML, other formats, such as other markup or scripting languages may be used.

III. An Exemplary User Device

The user device 10 may take one of several forms. In one embodiment, the user device is a Web-enabled mobile telephone. The user device may, alternatively, be a personal computer with an Internet connection. The user device 10 operates browser logic 30, which receives and interprets instructions sent by the system 18. The browser logic 30 may be implemented by browser software executed on the user device 10. The browser software may be such commercially available software as Internet Explorer, Netscape Navigator, Mozilla, Opera, Phoenix, or Lynx. The browser software may be a mobile browser, such as the Openwave mobile browser adapted to operate on a mobile device such as a personal digital assistant or a mobile phone. The browser logic 30 may provide special rendering logic to accommodate small sizes of the display 32, such as may be available on a mobile phone.

Figure 2:
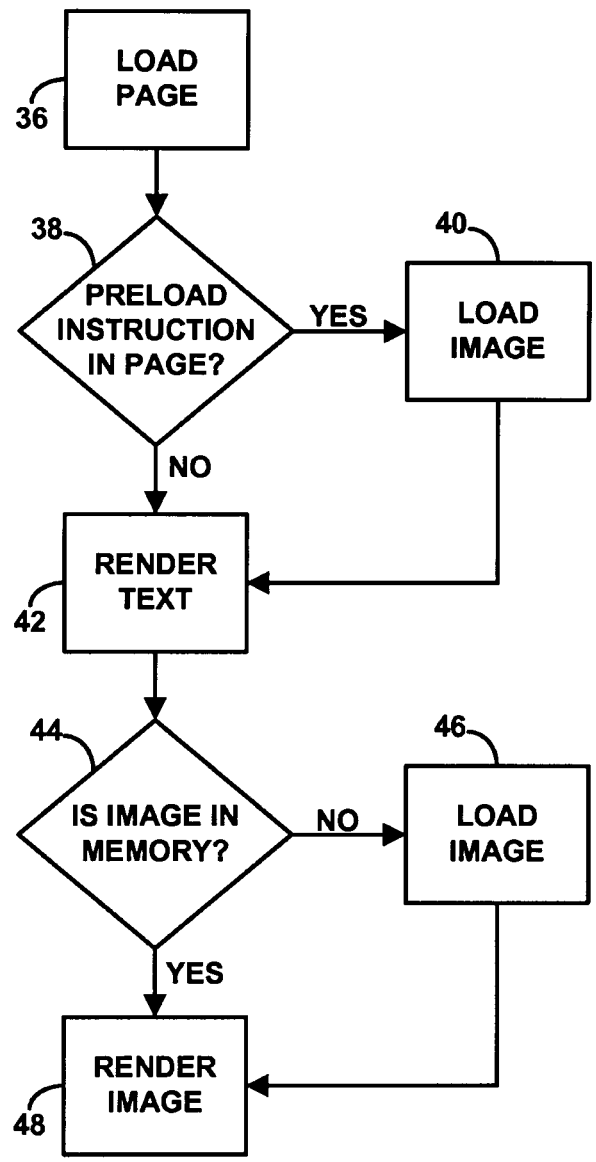
FIG. 2 is a schematic logical flow diagram of browser logic for use with the intermediary.

In one embodiment, the browser logic 30 operates according to the steps illustrated in FIG. 2. At step 36, the browser begins to load a data page sent by the system 18. If the browser logic encounters a preload instruction at step 38, it loads the referenced data, such as an image, at step 40 as directed by the preload instruction. The browser logic may begin to render any text included in the data page at step 42. At step 44, the browser logic (upon encountering an image tag, for example) determines whether the image has been loaded into memory. If not (for example, if there was no preload instruction for the image), the browser loads the image at step 46. Once the image is loaded, the browser logic renders the image at step 48.

In one embodiment of a system for enhancing the rendering of data pages, the functions of the intermediary described above are performed at the user device. In such an embodiment, intermediation logic on the user device 10 monitors communications between the browser logic 30 and a network such as the Internet. When the browser logic requests a data page, the intermediation logic responds with a preload page. In this embodiment, the browser may be enabled to operate the Internet Content Adaptation Protocol (ICAP), as described in RFC 3507 (April 2003).

IV. An Intermediation Method

Figure 4:
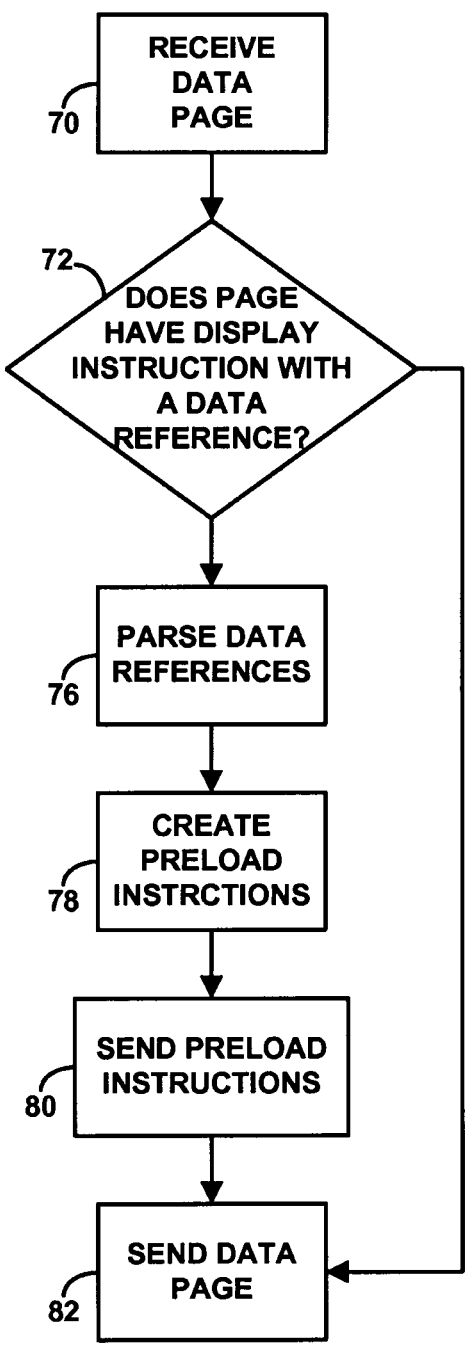
FIG. 4 is a schematic logical flow diagram illustrating the operation of the intermediary.

The operation of the intermediary 18 is illustrated in the flow diagram of FIG. 4. At step 70, the intermediary receives a page request sent by a user device, requesting a data page stored at a content server. At step 72, the intermediary sends a request for the data page to the content server. (The intermediary may create its own request for the data page, or it may forward the request from the user device.) The intermediary looks up the requested data page in the data reference storage in step 74 to determine, in step 76, whether the page has any data references selected for preloading.

If the requested page does not have data references (or if the page does not have an entry in the data reference storage), then after receiving the requested page at step 78, the intermediary sends the data page to the user device in step 80 in a response to the user device's original data page request.

If, on the other hand, the page does have data references selected for preloading, then the intermediary creates a preload page at step 82 and sends the preload page to the client device at step 84. The preload page includes preload instructions and one or more display instructions. In an embodiment such as that illustrated in FIG. 3b, the preload instructions may be provided in hidden frames, while a display instruction is sent in a displayed frame.

In one embodiment, when the intermediary receives the data page (step 86) that it requested at step 72, it stores the data page in a cache at step 88. In this embodiment, the display instruction in the preload page is an instruction to load and display the cached data page. For example, the preload instruction may be a displayed frame that identifies as its source the URL of the cached version of the data page. Alternatively, the preload instruction may be a displayed frame that identifies as its source the original URL of the data page.

In response to receiving the display instruction, the user device sends to the intermediary a request for the cached page, which the intermediary receives at step 90. In response to the request, the intermediary sends the cached page to the user at step 92.

Once the intermediary has a cached copy of the data page, it may parse the page at step 94 for data references and store the data references in the data reference storage at step 96.

V. Preload Correction

If a data page has been redesigned since the data reference storage was last updated, then preload instructions sent based on the contents of the intermediary's data reference storage may be outdated. In that case, a preload instruction may instruct a client device to load data that is no longer referenced in the data page. To alleviate potential delays caused by such unnecessary preloading, the intermediary may respond to unnecessary preload requests with abbreviated data that reduces the time spent on an unnecessary preload.

Figure 5:
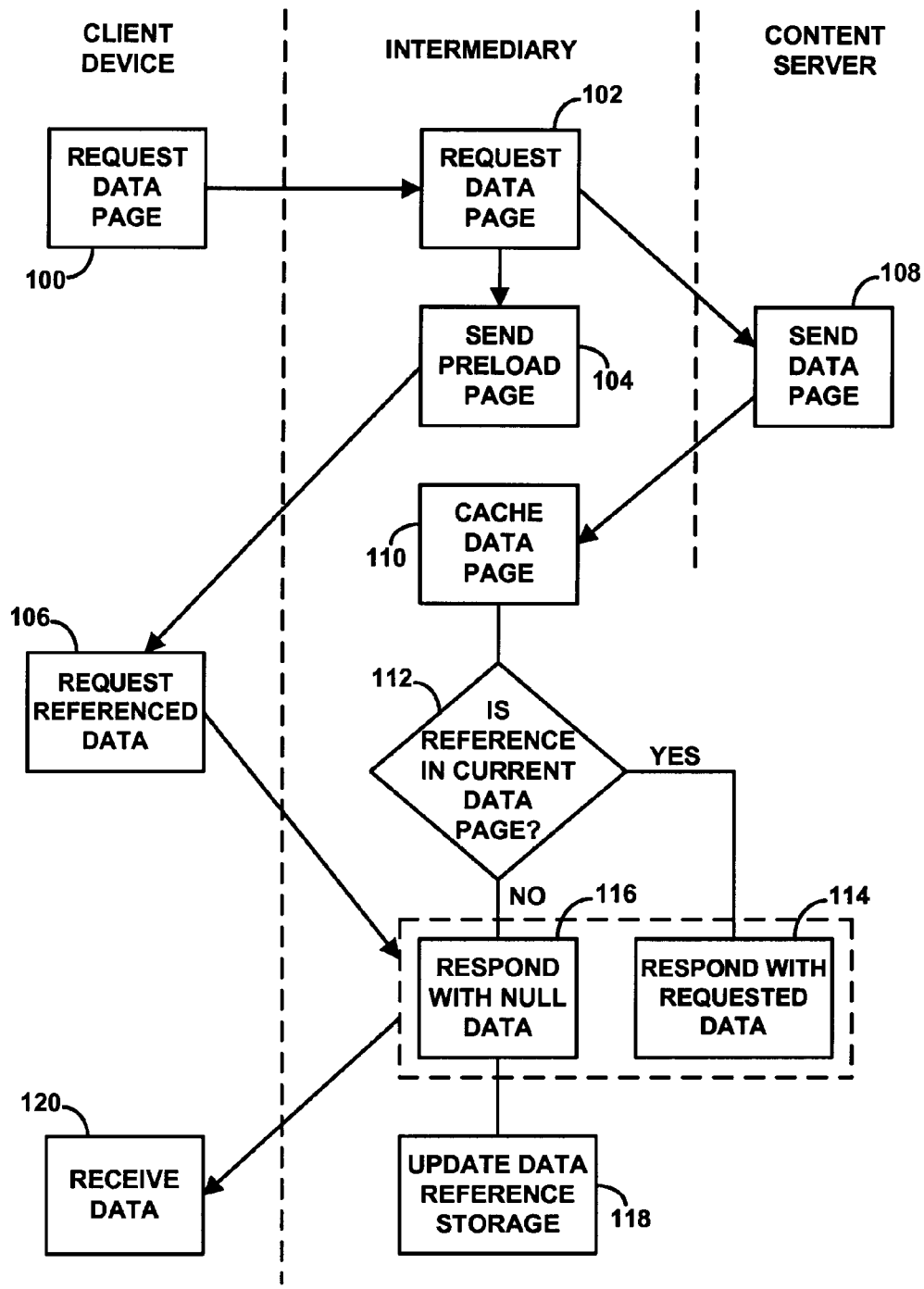
FIG. 5 is a schematic logical flow diagram illustrating the operation of another feature of the intermediary

The operation of such a feature is illustrated in FIG. 5. In step 100, the client device sends a request for a data page, which is received by the intermediary. After receiving the request from the client device, the intermediary sends its own request for the data page to the content server in step 102. The intermediary also creates a preload page, which it sends to the client device in step 104. The preload page in this embodiment includes preload instructions based on data references stored in the data reference storage of the intermediary. Because these preload instructions are based on data stored at the intermediary, rather than the content server, they may be obsolete. For example, an embedded image may have been removed from the data page at the content server since the data reference storage was last updated. Accordingly, when the client device requests the referenced data in step 106, it may be requesting data that will not be used in the data page.

To militate against unnecessary preloading, the intermediary monitors the current data page sent by the content server. The content server sends the current data page in step 108 in response to the intermediary's request (from step 102). When the intermediary receives the data page, it stores the data page in a cache at step 110. With the current, cached copy of the data page, the intermediary checks at step 112 whether each of the preload instructions it sent to the client device corresponds to data that is referenced in the cached copy of the data page.

If each of the preload instructions does correspond to data reference in the cached copy of the data page, then in step 144, the intermediary responds to the request for referenced data with the referenced data itself.

If, on the other hand, one of the preload instructions does not correspond to any data reference in the cached data page, then the intermediary responds to the request for that data with abbreviated data in step 112. In one embodiment, the abbreviated data may be null data, e.g. an HTTP response with a zero-sized data field. In another embodiment, the abbreviated data may be an HTTP response code, such as a code 204 "no response" code.

If the intermediary has already begun sending the referenced data to the client device when it determines that the referenced data is not used in the data page, the client device may abbreviate the data by ending the transmission or by substituting the remainder of the referenced data with easily-compressible data, such as a string of zeros. It is desirable to abbreviate the transmission of the referenced data with a syntactically-correct termination, so that the client device does not detect an error in the transmission. If the preload instructions sent in step 104 did not correspond to the cached data page, then the intermediary updates its data reference storage at step 118.

The client device receives either the referenced data or abbreviated data in step 120. As in the embodiment described with respect to FIG. 4, above, the client device also sends a request for the data page in response to a display instruction (such as a displayed frame tag) in the preload page. That exchange of data has been omitted from FIG. 5 for the sake of clarity of the illustration.

VI. Alternative Embodiments

The intermediary may be located at a variety of positions along a network. For example, the intermediary may be implemented in a proxy server associated with the user device 10. Alternatively, the intermediary may be implemented together with the content server 12. Where the user device 10 is a wireless device, the intermediary may be implemented by a wireless service provider. The intermediary may be implemented at an Internet Service Provider (ISP).

The system described herein can be embodied with variations from the examples described above, and the details of those embodiments can be implemented with a variety of techniques. For example, the content server 12 may be, for example, a publicly-accessible Web server available on the Internet, a restricted-access Web server available to subscribers, employees, or other individuals, or it may be a private Intranet server.

The user device 10 may be a wireless device such as a Web-enabled mobile telephone or a laptop computer with a wireless modem. Alternatively, the user device 10 may be a wired device such as a desktop or laptop computer with a cable, telephone, or DSL modem.

The referenced data need not be image data, such as still or moving image files. The referenced data may be, for example audio files. By causing a browser to preload audio files, the intermediation system may prevent, for example, background music from suddenly appearing at a delayed time after a data page visibly appears to a user.

The identification logic, code creation logic, parsing logic, and preload instruction logic may be implemented by computer-executable instructions stored in a data storage medium and executed by a processor. The data storage medium can be a removable or non-removable data storage medium, and it may be a random-access or read-only memory. Examples of data storage media are hard drives, DVD-ROMs, CD-ROMs, and memory cards.

The data reference storage may be, for example, a database stored on a computer hard drive.

The network interface may be implemented by a combination of hardware, such as a modem, and computer executable-instructions stored in a computer memory.

The embodiments described above should be understood to illuminate rather than limit the scope of the present invention. Features of the various embodiments can be interchanged and combined while keeping within the scope of the invention, as defined by the following claims.

The invention claimed is:

1. A method comprising:
receiving, at an intermediary positioned along a data path between a content server and a user device, a request from the user device for a data page at the content server;
consulting a data reference storage to locate an entry associated with the requested data page, wherein the entry identifies a data reference included in a version of the requested data page;
creating, at the intermediary, a preload page that includes a preload instruction to load the data referenced by the data reference;
sending the preload page to the user device in a response to the request for the data page;
determining, after sending the preload instruction, that the referenced data is not referenced in a current version of the data page;
receiving from the user device a request for the referenced data; and
responding to the request for the referenced data with abbreviated data.

* * * * *